June 23, 1925.                                                    1,543,498
C. R. HAMMOND
PISTON AND CONNECTING ROD FOR ENGINES
Filed March 21, 1924
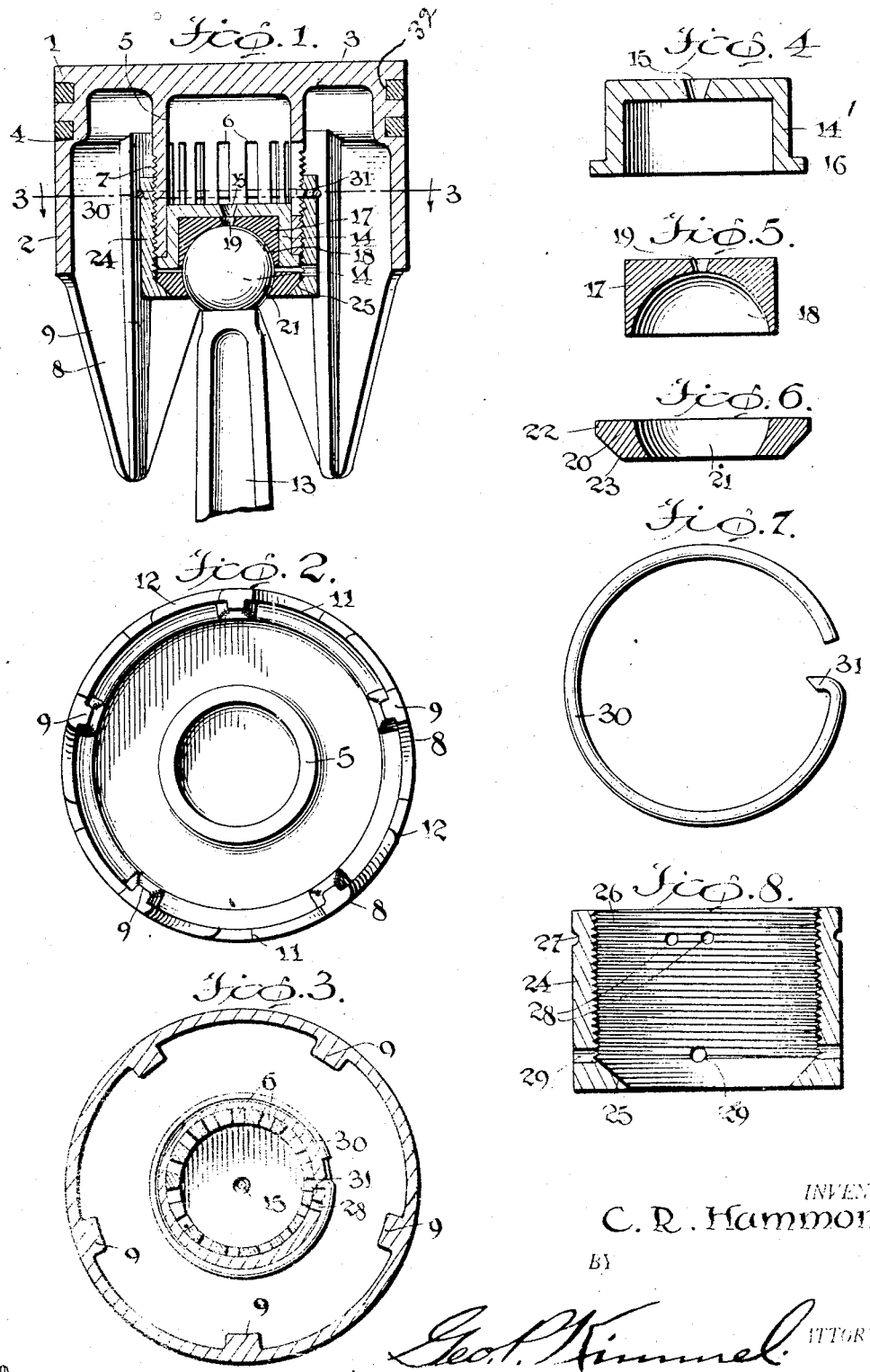
INVENTOR.
C. R. Hammond,
BY
Geo. P. Kimmel, ATTORNEY.

Patented June 23, 1925.

1,543,498

UNITED STATES PATENT OFFICE.

CLAYSON ROSS HAMMOND, OF SALEM, OREGON.

PISTON AND CONNECTING ROD FOR ENGINES.

Application filed March 21, 1924. Serial No. 700,858.

*To all whom it may concern:*

Be it known that I, CLAYSON ROSS HAMMOND, a citizen of the United States, residing at Salem, in the county of Marion and State of Oregon, have invented certain new and useful Improvements in Pistons and Connecting Rods for Engines, of which the following is a specification.

This invention relates to engines, more particularly to pistons and connecting rods for steam, air and internal combustion engines, and the object of the invention is to provide, in a manner as hereinafter set forth, a durable and highly efficient construction of piston and connecting rod for use in various types of engine cylinders and with the rod and piston set up in such relation with respect to each other whereby the connection between the rod and piston is very accessible.

A further object of the invention is to provide, in a manner as hereinafter set forth, a piston and rod each having cooperative means for connecting the rod with the piston, and with said means set up to provide for the convenient tightening thereof and further to prevent such means from backing up to prevent the disconnection of the rod from the piston until such means is shifted to released position.

A further object of the invention is to provide, in a manner as hereinafter set forth, a piston and connecting rod having means to constitute a bearing connection therebetween and with said means set up to provide for satisfactory lubrication between the connected ends of the rod and the piston.

A further object of the invention is to provide, in a manner as hereinafter set forth, a piston provided with a skirt set up to provide for the scraping of the lubricant back towards the crank case during the operation of the piston and further whereby said means prevents the piston from sizing and scoring in the cylinder when fitted past the expansion.

A further object of the invention is to provide, in a manner as hereinafter set forth, a piston and connecting rod having an adjustable connection therebetween and with the means to provide the connection set up to enable the accurate adjustment thereof to a minute part of an inch.

Further objects of the invention are to provide, in a manner as hereinafter set forth, a piston and connecting rod embodying the objects hereinbefore set forth, and which are simple in construction and arrangement, strong, durable, thoroughly efficient in use, readily assembled and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a sectional elevation of a piston and connecting rod, in accordance with this invention.

Figure 2 is a rear end view of the piston.

Figure 3 is a section on line 3—3, Figure 1.

Figure 4 is a cross sectional view of the holder for the forward bearing for the connected end of the connecting rod.

Figure 5 is a cross sectional view of the forward bearing for the connected end of the connecting rod.

Figure 6 is a cross sectional view of the rear bearing for the connected end of the connecting rod.

Figure 7 is a plan view of the locking ring.

Figure 8 is a cross sectional view of the combined adjusting and retaining member.

Referring to the drawings in detail, the piston which is cylindrical in contour comprises a body portion including a forward part 1 and a rear part 2. The forward end of the forward part 1 is closed, as at 3 and which constitutes the head of the piston. The inner diameter of the forward part 1 is smaller than the inner diameter of the rear part 2, and the latter is of greater length than the forward part 1. The setting up of the forward part 1 of an inner diameter less than the inner diameter of the rear part 2 provides an annular shoulder 4 on the inner face of the piston and at the rear terminus of the forward part 1.

Formed integral with the inner face of the head 3, as well as arranged concentrically with respect to the piston body, is a rearwardly extending cylindrical sleeve 5, having its body, intermediate its ends, formed with lengthwise extending rectangular slots 6 substantially spaced from each other. The periphery of the sleeve 5 is formed with threads 7, which extend from a point removed from the forward end of the sleeve 5 and terminate at the rear end thereof. The function of the slots 6 will be presently referred to.

The piston further includes a skirt and which is formed integral with and extends rearwardly from the rear terminus of the part 2 and is constructed from a series of substantially triangular shaped projections 8. Formed integral with the shoulder 4, and also with the inner faces of the part 2 and projections 8, is a series of longitudinally extending reinforcing ribs each arranged in spaced relation with respect to each other and further disposed centrally of a projection. One side edge of each of the projections 8 is formed with a sharp point 11 and the other side rounded, as at 12, and the said point 11 is employed for scraping the lubricant back towards the crank case. This scraping action causes a slight resistance and serves to rotate the piston slightly in the cylinder. The skirt further prevents the piston from sizing or scoring the cylinder wall during the operation of the piston.

The connecting rod is indicated by the reference character 13 and is formed with a spherical end 14, which is connected in a manner to be hereinafter referred to, medially of the piston body and such connection is a universal one.

Extended into the rear end of the sleeve 5, is an inverted cup-shaped holder 14', having its forward or closed end formed medially with a tapered opening 15, and its rear end with a laterally extending flange 16, which when the holder 14' is mounted in the rear end of the sleeve 5 abuts against the rear end of the sleeve 5, as shown in Figure 1.

Mounted in the holder 14', is a cylindrical bearing block 17, termed the forward bearing and which has its rear face provided with a semi-spherical recess 18 and its forward end with a tapering opening 19 which communicates with the recess 18 and which furthermore aligns with the opening 15 in the holder 14', when the bearing 17 is mounted in said holder. When the bearing 17 is mounted in position it is adapted to inclose the forward portion of the spherical end 14 of the connecting rod 13, and acts as a bearing for said end.

Positioned adjacent the rear end of the sleeve 5 is a bearing disk 20, which is termed the rear bearing for the spherical end 14 of the rod 13. The disk 20 is formed with an opening 21, having its wall rounded and gradually increasing in diameter from the rear to the forward end of the disk and with said wall of the opening 21 conforming in curvature to the rear part of the spherical end 14 of the rod 13. The disk 20 is formed of two different diameters, and the part of greater diameter is indicated at 22, and the part of smaller diameter at 23. The part 23 gradually increases in diameter towards the part 22, whereby a portion of the periphery of the disk 20 is tapered. The diameter of the part 22 is substantially the same as the diameter of the flange 16 and when the disk 20 is mounted in position the periphery of the part 22 is in alignment with the outer edge of the flange 16. When the rear bearing is set up in its adjacent position with respect to the sleeve 5 and the forward bearing 17, it is slightly spaced therefrom to provide for adjustment in a manner as shown in Figure 1 of the drawings.

Adjustably mounted upon the sleeve 5 is a combined adjusting and retaining member which is formed from a hollow cylindrical body portion 24 having the rear end portion of its inner face set up to provide a bevelled seat 25, for the part 23 of the disk 20. That portion of the inner face of the adjusting and retaining member which extends from the seat 25 to the forward end of said member is threaded throughout, as indicated at 26, for engagement with the threads 7 of the sleeve 5. The body portion 24 has an annular peripheral groove 27, a pair of openings 28, which communicate with the groove 27, and a plurality of openings 29 near its rear end and which communicate with the interior of the body portion 24 forwardly with respect to the seat 25, and said openings 29 provide means for supplying lubricant between the forward and rear bearings and to the spherical end 14 of the rod 13.

The combined adjusting and retaining member has threaded engagement with the threads 7 of the sleeve 5, and when said member is mounted in position it projects rearwardly from the rear end of said sleeve 5 and supports the rear bearing in position adjacent to the forward bearing and holder 14'.

For the purpose of securing the combined adjusting and retaining member in its adjusted position, as well as to prevent backward movement of said member after it has been adjusted, a locking ring 30 is employed and which is seated in the groove 27 and extends around the said adjusting and retaining member. The locking ring 30 is split and one of its ends is inturned, as at 31 to provide what may be termed a ratchet pawl. The end 31 is adapted to extend through either of the openings 28 and into a slot 6, whereby the combined adjusting and retaining member is secured in the position to which it has been adjusted. The slot 6 not only provides means cooperating with the ends 31, providing what may be termed a ratchet, but also means to enable the passage of lubricant into the sleeve 5 and from and through the openings 15 and 19 for supply to the spherical end 14 of the rod 13. The openings 28 are so set up as to be out of alignment with the slots 6 in the sleeves 5, and this provides for the adjustment of the combined adjusting and retaining member to a minute fraction of an inch. The ring 30 is what may be termed a ratchet spring lock ring and as before stated will arrest backward movement of the adjusting and retaining member, but it will not interfere with the forward adjustment of said member when desired.

The part 1 is provided with a plurality of peripheral grooves 32 for the reception of the packing rings.

Although the preferred embodiment of the invention is as illustrated and described, yet it is to be understood that changes in the details of construction can be had which will fall within the light of the invention as claimed.

What I claim is:—

1. A piston comprising a body portion formed with a rearwardly extending skirt, said skirt consisting of a plurality of triangular-shaped spaced projections arcuate in cross section, each of said projections having one edge provided with a sharp point for scraping lubricant towards the crank case during the operation of the piston, and its other edge rounded.

2. A piston comprising a body portion formed with a centrally disposed sleeve formed integral with and extending rearwardly from the head of the piston, a pair of opposed bearing elements for one end of a connecting rod, means for supporting one of said elements within said sleeve, a combined adjusting and retaining member for supporting the other of said elements rearwardly with respect to and for adjustably connecting it with said sleeve, said element shaped to surround the said end of the connecting rod, said sleeve provided with lengthwise extending slots, and means engageable in said slots and carried by said member to provide a ratchet lock for the latter.

3. A piston comprising a body portion, a sleeve arranged centrally thereof and formed integral with and projecting rearwardly from the head of the piston, said sleeve provided with lengthwise slots, a holder extended in the rear end of said sleeve and provided with an opening communicating with the sleeve, a forward bearing element mounted in the holder and provided with a semi-spherical recess and an opening communicating with the opening in the holder, a rear bearing positioned adjacent to the forward bearing and provided with an opening having the wall thereof forming a continuation of the wall of said recess, said bearings constituting means for connecting one end of a connecting rod with said sleeve, a combined adjusting and retaining member having threaded engagement with said sleeve and provided with a seat for said rear bearing and further constituting means for adjusting the rear bearing with respect to the forward bearing, said member provided with openings, and a split locking ring seated in the periphery of said member and extended through the latter and engageable in one of said slots to provide a ratchet lock for maintaining said member in adjusted position.

4. A piston comprising a body portion formed with a rearwardly extending skirt, said skirt consisting of a plurality of triangular-shaped spaced projections arcuate in cross section, each of said projections having one edge provided with a sharp point for scraping lubricant towards the crank case during the operation of the piston, and its other edge rounded, said body portion having its inner face provided with lengthwise extending reinforcing ribs each having its rear end terminating at the rear end of one of said projections and each further positioned at the center of a projection.

5. A piston comprising a body portion formed with a rearwardly extending skirt provided with triangular-shaped projections having one edge shaped to scrape lubricant towards the crank case and for revolving the piston during the operation thereof.

In testimony whereof, I affix my signature hereto.

CLAYSON ROSS HAMMOND.